(12) United States Patent
Shah et al.

(10) Patent No.: US 9,043,820 B2
(45) Date of Patent: May 26, 2015

(54) ADVERTISEMENT DELIVERY ENGINE

(71) Applicant: Verizon Patent and Licensing Inc., Basking Ridge, NJ (US)

(72) Inventors: Keyur K. Shah, Euless, TX (US); Biplab K. Pramanik, Tampa, FL (US); Saivivek Thiyagarajan, Ashburn, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 39 days.

(21) Appl. No.: 13/626,361

(22) Filed: Sep. 25, 2012

(65) Prior Publication Data

US 2014/0089956 A1    Mar. 27, 2014

(51) Int. Cl.
| | |
|---|---|
| *H04H 60/32* | (2008.01) |
| *H04N 21/258* | (2011.01) |
| *H04N 21/442* | (2011.01) |
| *H04N 21/475* | (2011.01) |
| *H04N 21/658* | (2011.01) |
| *H04N 21/81* | (2011.01) |

(52) U.S. Cl.
CPC ... *H04N 21/25891* (2013.01); *H04N 21/44222* (2013.01); *H04N 21/4758* (2013.01); *H04N 21/6582* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 8,165,598 B2 * | 4/2012 | Tran et al. | 455/456.1 |
| 2003/0110485 A1 * | 6/2003 | Lu et al. | 725/9 |
| 2004/0117827 A1 * | 6/2004 | Karaoguz et al. | 725/42 |
| 2007/0283384 A1 * | 12/2007 | Haeuser et al. | 725/34 |
| 2008/0109843 A1 * | 5/2008 | Ullah | 725/34 |
| 2008/0244638 A1 * | 10/2008 | Ryden | 725/34 |
| 2009/0210899 A1 * | 8/2009 | Lawrence-Apfelbaum et al. | 725/34 |
| 2011/0321084 A1 * | 12/2011 | Takahashi et al. | 725/32 |
| 2013/0061268 A1 * | 3/2013 | Rothschild | 725/51 |

* cited by examiner

*Primary Examiner* — Nasser Goodarzi
*Assistant Examiner* — Adil Ocak

(57) ABSTRACT

A method includes receiving first information identifying profile information associated with a customer, habit information associated with the customer's television viewing habits, or Internet usage information associated with the customer. The method also includes receiving preference information from the customer, wherein the preference information identifies advertisements or types of advertisements that the customer would like to view or would not like to view. The method further includes identifying advertisements based on the received first information and the received preference information, inserting, by a service provider, the identified advertisements in a television programming data stream and providing the identified advertisements to the customer.

22 Claims, 8 Drawing Sheets

ADVERTISEMENT DELIVERY ENGINE

BACKGROUND INFORMATION

Providing advertisements to consumers has become increasingly important for businesses attempting to sell goods and/or services. For example, advertisements are provided to consumers via mobile devices, such as smart phones. Advertisements are also provided to consumers via broadcast, satellite or cable television.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to providing advertisements that are likely to be relevant to a customer and to provide an enhanced customer experience with respect to viewing advertisements. In one implementation, advertisements (also referred to herein as ads) are provided to a user based on a user's habits with respect to viewing television programming, a user's purchase history with respect to purchasing products and/or services, a user's Internet browsing history and/or user-defined criteria. A service provider associated with identifying ads and inserting ads into a media stream, such as television programming, may continuously update information regarding the user to further tailor the user's ad experience based on the user's habits, profile and preferences. In addition, the service provider may collect data regarding the effectiveness of ads or ad campaigns and provide the effectiveness information to advertisers. This may allow advertisers to further tailor the ads/ad campaigns to particular customers.

Figure 1:
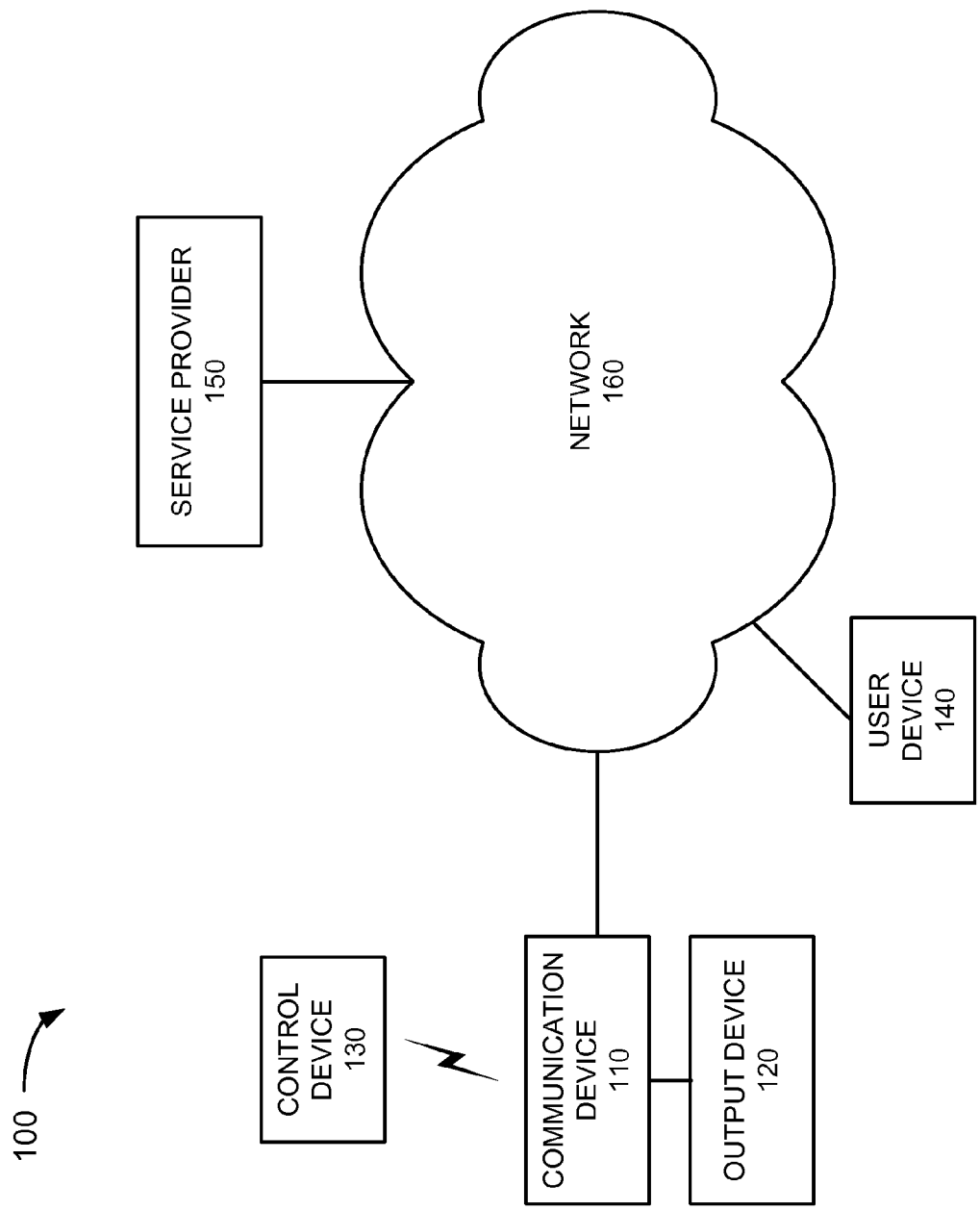
FIG. 1 illustrates an exemplary network in which systems and methods described herein may be implemented.

FIG. 1 is a block diagram of an exemplary network 100 in which systems and methods described herein may be implemented. Network 100 may include communication device 110, output device 120, control device 130, user device 140, service provider 150 and network 160.

Communication device 110 may include any type of device that is able to receive data, such as text data, video data, image data, audio data, multi-media data, etc., transmitted from a source, such as service provider 150. Communication device 110 may decode the data and output the data to output device 120 for viewing or playing. In an exemplary implementation, communication device 110 may include a set top box used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, communication device 110 may forward the decoded data for viewing or playing by another device, such as output device 120. In other implementations, communication device 110 may play and display the decoded media.

For example, in some implementations, communication device 110 may include some type of computer, such as a personal computer (PC), laptop computer, home theater PC (HTPC), smart television (TV), etc., that is able to receive incoming data and decode the incoming data for output to a display, which may be included with communication device 110. In this instance, communication device 110 may include logic, such as a cable card or other logic, to interface with service provider 150. Communication device 110 may also include a digital video recorder (DVR) or any other recording device configured to record programs provided by service provider 150. The recorded programs may be available for later viewing via output device 120.

Output device 120 may include any device that is able to output/display various media, such as a television, monitor, PC, laptop computer, HTPC, a personal digital assistant (PDA), a web-based appliance, a mobile terminal (e.g., a cellular telephone), etc. In an exemplary implementation, output device 120 may receive multi-media data from communication device 110 and display or play the media.

Control device 130 may include any device or combination of devices capable of transmitting commands to and/or receiving information from a device, such as communication device 110 or another device/system via a network, such as network 160. In one implementation, control device 130 may include a remote control device that uses infrared (IR) signals or other types of wireless signals to transmit commands and/or input information, such as information associated with recording programs, to communication device 110. Communication device 110 may receive the signals from control device 130 and perform the desired function based on the particular signal/command. In other implementations, control device 130 may include any type of communication device, such as a wireless or cellular telephone device (e.g., a smart phone, a PDA that can include a radiotelephone, or the like). In still other implementations, control device 130 may include a PC, laptop computer, tablet computer or other computing device. In such implementations, control device 130 may connect to communication device 110 and/or network 160 via any conventional technique, such as wired, wireless, or optical connections, to transmit commands and/or input information to communication device 110.

User device 140 may include a personal computer (PC), a laptop or notebook computer, an ultra mobile personal computer (UMPC), a tablet computer, a netbook, or other types of computation or communication devices. User device 140 may also include any type of communication device, such as a voice over Internet protocol (VoIP) telephone (e.g., a session initiation protocol (SIP) telephone), a wireless or cellular telephone device, such as a smart phone (e.g., a personal communications system (PCS) terminal that may combine a cellular radiotelephone with data processing and data communications capabilities, a personal digital assistant (PDA) that can include a radio, or the like), etc. In one implementation, user device 140 may include any device (e.g., an Internet Protocol (IP)-based device) that is capable of accessing services (e.g., Internet services) provided by service provider 150 via network 160. In some implementations, user device 140 may be configured to interact with a home networking router (not shown) and/or connect to network 160 via wired, wireless, or optical connections.

Service provider 150 may include one or more computing devices, servers and/or backend systems that are able to connect to network 160 and transmit and/or receive information via network 160. In an exemplary implementation, service provider 150 may provide multi-media information, such as television shows, movies, sporting events, podcasts or other media presentations to communication device 110 for output to a user/viewer. Service provider 150 may also provide Internet access to users, such as a user associated with user device 140.

Service provider 150 may also provide a customized advertisement experience to a user associated with communication device 110 and/or user device 140, as described in detail below. The terms "advertisement" and "ad," as used herein, should be construed to included multimedia advertisements, such as multimedia commercials or ads provided by service providers or broadcast networks during television programming (e.g., during a commercial break in the television programming), multimedia advertisements or commercials provided by service providers prior to providing a media stream on a computer device, multimedia advertisements or commercials provided within a media stream provided on a computer device or mobile device (e.g., during a commercial break), text-based advertisements provided as pop-ups, overlays or banner type ads, audio-based ads provided to television devices, radio devices and mobile devices, or any other type of advertising.

Network 160 may include one or more wired, wireless and/or optical networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, an optical network or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, backend systems, etc., that aid in routing information, such as media streams from service provider 150 to communication device 110 and/or user device 140. In addition, although communication device 110, output device 120, control device 130 and user device 140 are shown as separate devices in FIG. 1, in other implementations, the functions performed by two or more of these devices may be performed by a single device or platform. .

As described briefly above, service provider 150 may provide programming, such as television programming, on-demand programming, pay-per-view programming, etc., as well as provide Internet access to users. In an exemplary implementation, service provider 150 may provide and/or identify advertisements to be provided to users (also referred to herein as customers) based on a number of user-based factors, such as a user's habits with respect to watching television, a user's habits with respect to searching the Internet, user-defined criteria, etc. In each case, service provider 150 may identify ads that are likely to be relevant to the user to enhance the user's experience with respect to viewing ads.

Figure 2:
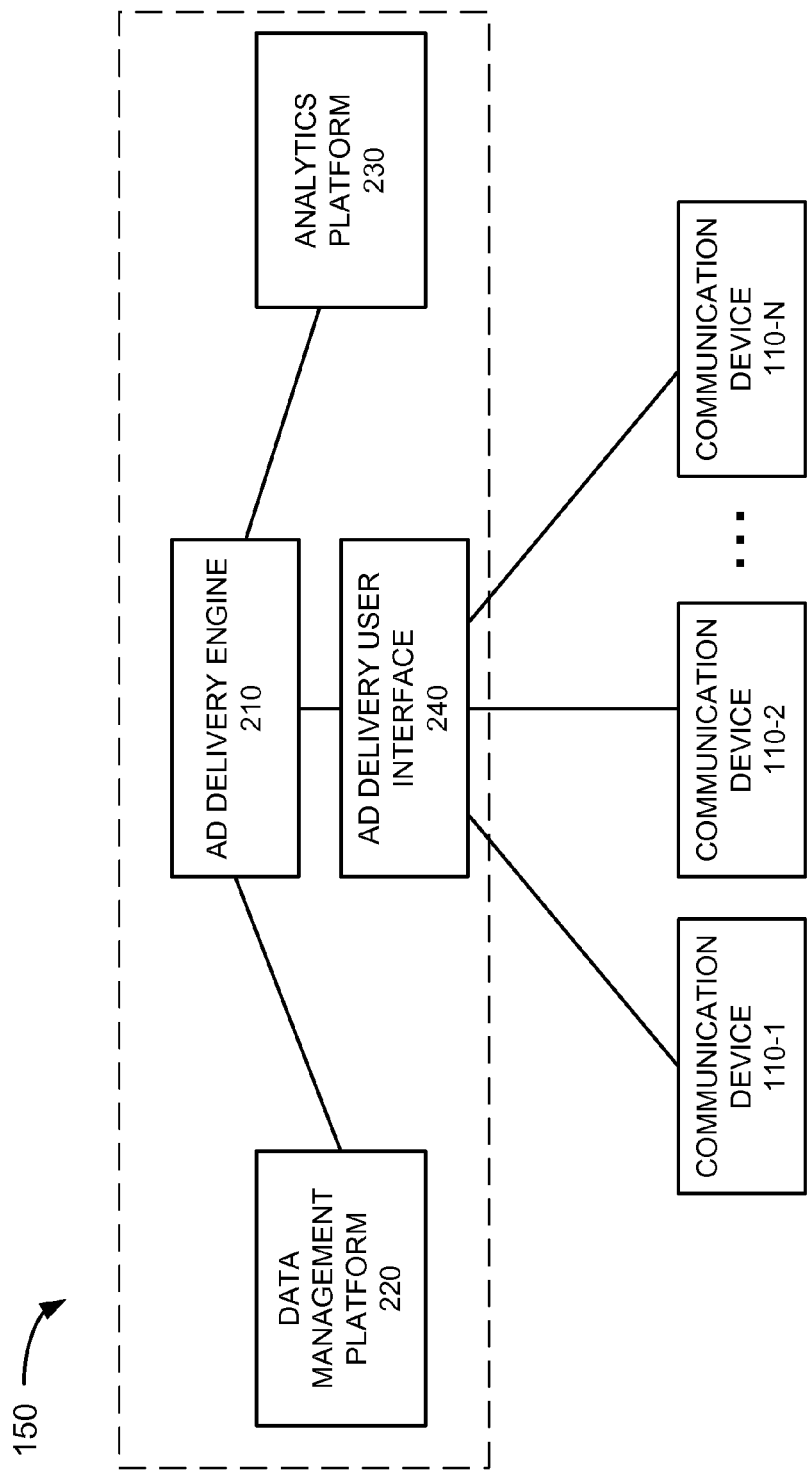
FIG. 2 illustrates an exemplary configuration of a portion of the network of FIG. 1.

FIG. 2 illustrates an exemplary components associated with provide a customized ad experience. Referring to FIG. 2, service provider 150 may include ad delivery engine 210, data management platform 220, analytics platform 230 and ad delivery user interface 240. The components illustrated within the dotted box may be implemented by service provider 150. In other implementations, one or more of these components may be implemented by another entity. In each case, service provider 150 may provide a customized ad experience to customers associated with communication devices 110-1 through 110-N (referred to collectively as communication devices 110), such that a customer at communication device 110-1 may receive different ads than a customer at communication device 110-2.

Ad delivery engine 210 may include one or more computing devices that identify particular ads that may be relevant to a particular customer. For example, ad delivery engine 210 may serve and/or identify ads to include in a media stream delivered to communication devices 110-1 through 110-N. In an exemplary implementation, ad delivery engine 210 may serve ads tailored or customized to particular individual customers, as described in detail below.

Data management platform 220 may include one or more computing devices that collect and store information associated with first party data obtained from a user's interaction with service provider 150. For example, data management platform 220 may obtain data collected by service provider 150 based on a user's profile, such as products and/or services that the user receives from service provider 150. Data management platform 220 may also obtain data based on the user's television viewing habits, a user's Internet browsing history, a user's online purchasing history, etc. Data management platform 220 may also receive data from third parties, such as retailers, social media sites, etc., that may be used to aid in identifying ads that may be relevant to a particular customer. In some implementations, data management platform 220 may obtain an Internet protocol (IP) address associated with the customer based on the customer contacting a service/help website associated with service provider 150. The IP address may then be used to obtain additional information regarding the customer, such as the customer's likely age and/or gender.

Analytics platform 230 may include one or more computing devices that analyze data associated with ads and/or ad campaigns. For example, analytics platform 230 may analyze the effectiveness of an ad based on whether a viewer watched the ad, changed channels during the ad, interacted with an ad, such as downloaded a coupon associated with an ad, made a purchase associated with the ad, etc.

Ad delivery user interface 240 may include one or more computing devices that provide a user interface, such as a graphical user interface (GUI), which allows a user to define criteria with respect to advertisements. For example, a user may define types or categories of ads that he/she does not want to view (e.g., set user or parental controls), such as ads associated with adult related content, ads for certain types of food or beverages (e.g., sugary snacks, alcoholic beverages), ads with violent themes, etc. Ad delivery user interface 240 may also allow a user to define ads for certain products or types of products (e.g., consumer electronics, automobiles, etc.) that the user would like to view. In some implementations, ad delivery user interface 240 may allow the user to enter subjective criteria associated with delivering ads, such as request that service provider 150 provide only ads that are deemed appropriate for the entire family, including young children, provide only ads that are humorous, etc.

Ad delivery engine 210 may receive inputs from data management platform 220, analytics platform 230 and ad delivery user interface 240 and identify ads or ad categories that are likely to be relevant to each customer. In this manner, ad delivery engine 210 provides an enhanced ad experience for service provider 150's customers, as described in detail below.

Figure 3:
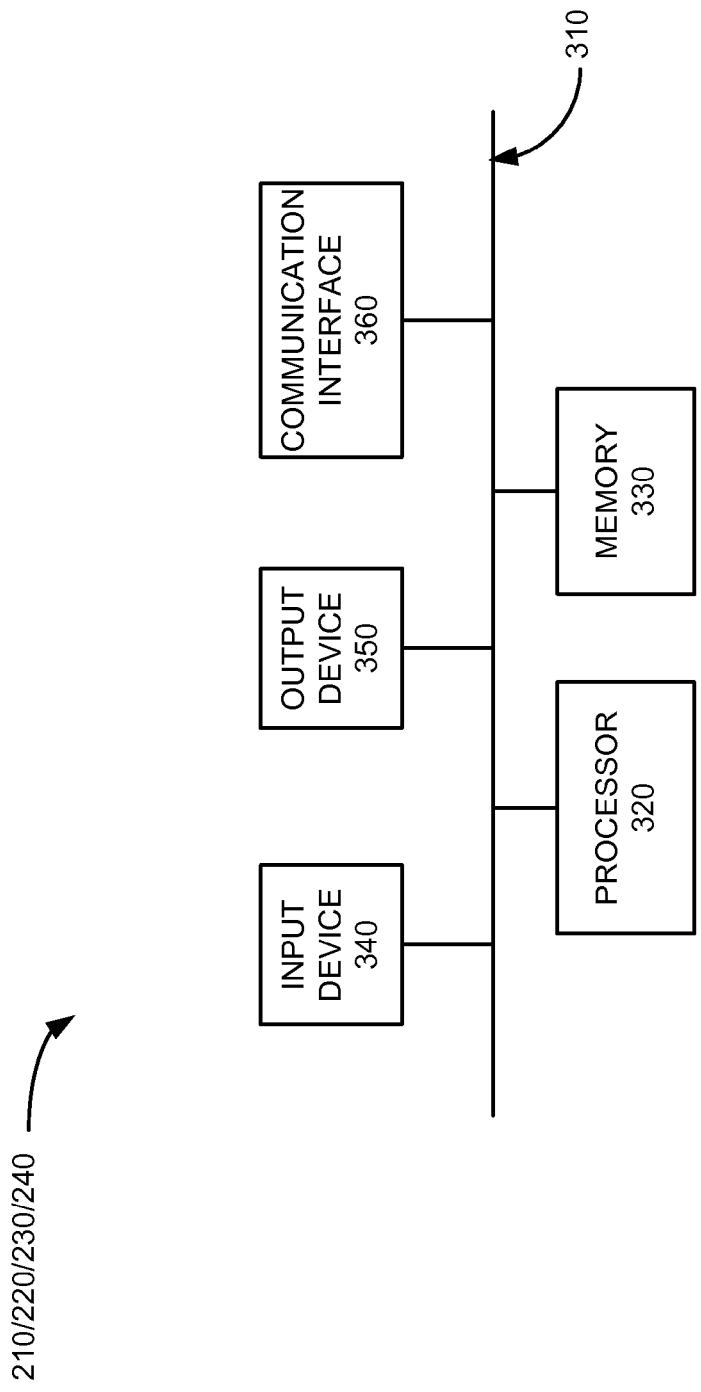
FIG. 3 illustrates an exemplary configuration of logic components implemented in one or more of the components of FIG. 2.

FIG. 3 illustrates an exemplary configuration of ad delivery engine 210. Data management platform 220, analytics platform 230 and ad delivery user interface 240 may be configured in a similar manner. In addition, other devices in network 100, such as communication device 110, output device 120, control device 130 and user device 140 may be configured in a similar manner. Referring to FIG. 3, ad delivery engine 210 may include a bus 310, a processor 320, a memory 330, an input device 340, an output device 350 and a communication interface 360. Bus 310 may include a path that permits communication among the elements ad delivery engine 3.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to ad delivery engine 210, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include a transceiver that ad delivery engine 210 may use to communicate with other devices (e.g., communication devices 110, data management platform 220, analytics platform 230, ad delivery user interface 240, etc. For example, communication interface 360 may include mechanisms for communicating with communication device 110 via wired, wireless or optical mechanisms. Communication interface 360 may also output advertisements into a media stream to be output to communication device 110 or signal an ad inserter (not shown) associated with service provide 150 to insert ads into the media stream to be output to communication device 110. Communication interface 360 may also include one or more radio frequency (RF) transmitters, receivers and/or transceivers and one or more antennas for transmitting and receiving RF data via network 160. Communication interface 360 may also include a modem or an Ethernet interface to a LAN or other mechanisms for communicating via a network, such as network 160 or another network.

The exemplary configuration illustrated in FIG. 3 is provided for simplicity. It should be understood that ad delivery engine 310 may include more or fewer devices than illustrated in FIG. 3. For example, various modulating, demodulating, coding and/or decoding components or other components may be included in ad delivery engine 210.

Ad delivery engine 210 may perform processing associated with identifying and/or providing ads to customers, such as customers associated with communication devices 110. Ad delivery engine 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
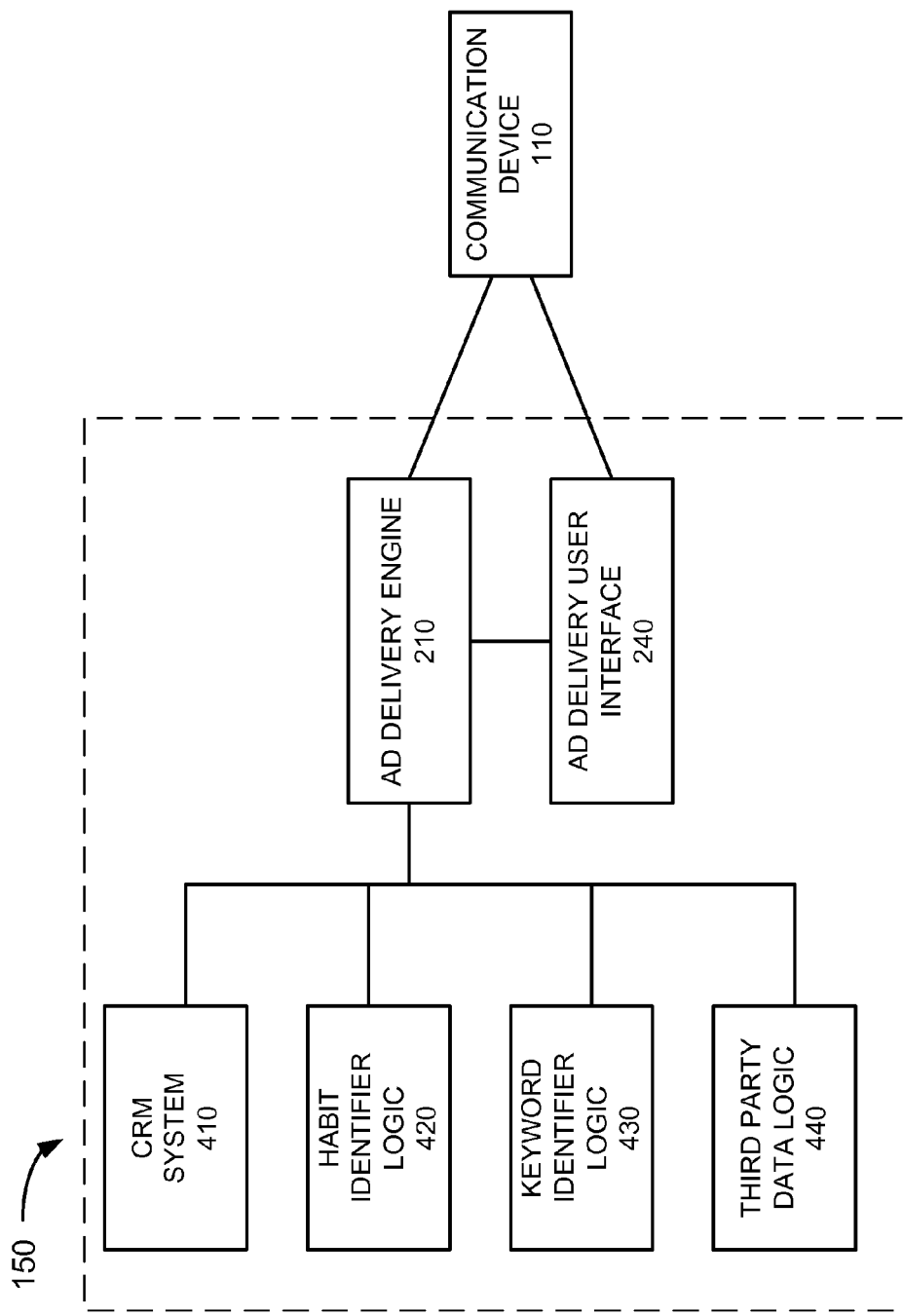
FIG. 4 illustrates exemplary components implemented by the service provider of FIG. 1.

FIG. 4 is an exemplary functional block diagram of components implemented in service provider 150 to aid in providing relevant ads to customers. Referring to FIG. 4, service provider 150 includes customer relationship management (CRM) system 410, habit identifier logic 420, keyword identifier logic 430 and third party data logic 440. The components illustrated within the dotted box may be implemented by service provider 150. In other implementations, one or more of these components may be implemented by another entity. Ad delivery engine 210 may receive inputs from components 410-440 and identify ads that would be expected to be relevant to the customer based on one or more of the inputs.

For example, CRM system 410 may include one or more computing devices that store information regarding a customer's profile, such as products and/or services provided to each customer. As an example, assume that a party associated with communication device 110 in FIG. 1 receives cable television services, Internet services and telephone services from service provider 150. In this case, CRM system 410 may store information regarding a level of cable TV service (e.g., level of service/channels subscribed to, premium channels subscribed to, pay per view movies or programs downloaded or purchased, etc.) to which the customer subscribes. CRM system 410 may also store information regarding the level of Internet service to which the customer subscribes. CRM system 410 may also store information regarding customer purchases during particular time frames, as well as store other interactions with service provider 150, such as information requesting information via one or more widgets provided by communication device 110 via output device 120. CRM system 410 may also store demographic data associated with the customer, such as the age of the customer, sex of the customer, number, age and sex of people in the customer's household, salary information associated with the customer, etc. Ad delivery engine 210 may use this information to personalize an ad experience for each particular customer.

Habit identifier logic 420 may include logic that identifies and stores habit information for each customer. For example, habit identifier logic 420 may identify habits associated with the customer's live TV watching and recorded TV program watching. In particular, habit identifier logic 420 may identify a customer's behavior with respect to viewings ads, such as whether the customer changes the channel when ads or particular types of ads are provided for live programming, pauses the live programming when an ad is provided, but resumes watching the ad when he/she goes back to viewing, interacts with interactive ads provided to the customer, etc. Habit identifier logic 420 may also identify pause/resume/replay habits associated with use of a DVR that may be included in communication device 110. For example, habit identifier logic 420 may determine whether the user fast forwards through certain ads/types of ads when viewing recorded programs, but watches/views other types of ads.

In instances where service provider 150 also provides Internet service to the customer associated with communication device 110, habit identifier logic 420 may access Internet access history associated with user device 140, identify websites visited and time spent on particular websites, identify types of websites frequently visited (e.g., sports related websites, shopping websites, particular retailer websites, etc.), identify searches made (e.g., searches made for a particular product) and/or browsing history, etc. Habit identifier logic 420 may use this data to identify habits and interests of a customer.

Keyword identifier logic 430 may include logic that identifies keywords/terms associated with a program currently being viewed. For example, keyword identifier logic 430 may include speech recognition software that identifies words/terms frequently spoken in a particular program. Keyword identifier logic 430 may also identify keywords/terms based on subtitles provided for a program currently being viewed, such as closed captioning subtitles, subtitles for foreign language programs, etc. Keyword identifier logic 430 may further identify keywords based on program guide information for a program currently being viewed, as well as for programs viewed in the past, such as programs viewed in the last 30 minutes, 60 minutes, 24 hours, etc.

Third party data logic 440 may include logic and/or one or more memories that obtain and store data gathered from entities external to service provider 150. For example, third party data logic 440 may obtain data from marketing entities that gather data on viewers, such as demographic information including estimated income information, data regarding publications (e.g., magazines, newspapers) to which the customer subscribes, etc. Third party data logic 440 may also obtain information regarding customers that is gathered from social websites, professional network websites, etc.

CRM system 410, habit identifier logic 420, keyword identifier logic 430 and third party data logic 440 may provide input to ad delivery engine 210. Ad delivery engine 210 may also receive input directly from the customer via ad delivery user interface 240. As described above, ad delivery user interface 240 may provide a GUI that allows the user to input information identifying particular ads or types of ads that the customer would like to view, does not want to view, etc. Ad delivery engine 210 may receive all the inputs from these devices and identify ads that are likely to be more relevant to a particular customer than the standard ads provided via television networks, as described in more detail below.

Figure 5:
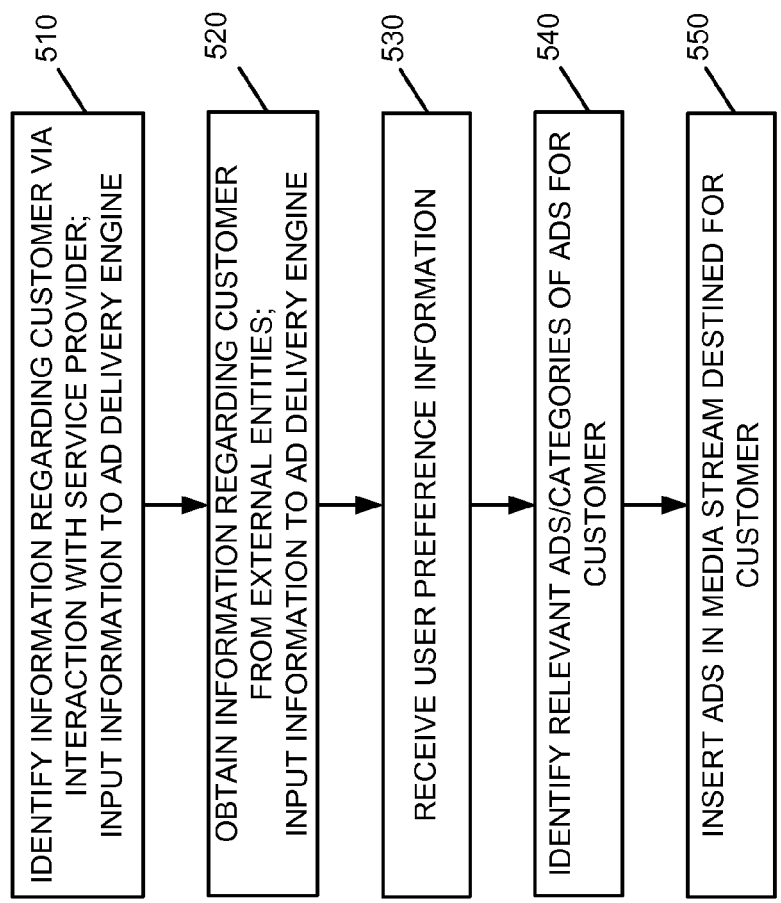
FIG. 5 is a flow diagram illustrating exemplary processing associated with identifying advertisements for a customer.

FIG. 5 is a flow diagram illustrating exemplary processing associated with identifying ads to be provided to a viewer/customer. In this example, assume that service provider 150 provides cable TV programming, Internet service and telephone service (e.g., landline telephone service and/or wireless telephone service) to a customer associated with communication device 110, output device 120 and user device 140 shown in FIG. 1. Processing may begin with CRM system 410, habit identifier logic 420, keyword identifier logic 430 and third party data logic 440 gathering information associated with the customer. For example, CRM system 410 may gather information associated with the customer's interaction with service provider 150 (block 510). As discussed above, CRM system 410 may gather and store information regarding a level of cable TV service (e.g., premium channels subscribed to, pay per view movies or programs downloaded or purchased, etc.) to which the customer subscribes. CRM system 410 may also store information regarding the level of Internet service to which the customer subscribes. CRM system 410 may further store information regarding customer purchases during particular time frames, customer interaction via one or more widgets provided via output device 120, etc. CRM system 410 may also store demographic data associated with the customer, such as the age of the customer, sex of the customer, number, age and sex of people in the customer's household, salary information associated with the customer, etc.

Habit identifier logic 420 may identify habits associated with the customer's live TV watching and recorded program watching over a period of time (e.g., one day, one week, one month, etc). In particular, habit identifier logic 420 may identify a customer's behavior with respect to viewings ads, such as whether the customer changes the channel when ads or particular types of ads are provided during TV programming, pauses the TV programming when an ad is provided, but resumes watching the ad when he/she goes back to viewing, interacts with interactive ads provided to the customer (e.g., enters an input to get more information regarding a particular item identified in a TV program or an ad), etc. Habit identifier logic 420 may also identify pause/resume/replay habits associated with use of a DVR that may be included in communication device 110. For example, habit identifier logic 420 may determine whether the user fast forwards through certain ads/types of ads when viewing recorded programs, but watches/views other types of ads. As an example, habit identifier logic 420 may determine that the user fast forwarded through a beer ad provided by brand X. In this case, habit identifier logic 420 may determine that the customer is not a beer drinker and that ad delivery engine 210 should not provide the customer with beer-related ads. As another example, habit identifier logic 420 may determine that the user fast forwards through beer ads for brand X, but watches beer ads for brand Y. In this case, habit identifier 420 may determine that the customer is a beer drinker who favors brand Y.

Continuing with the exemplary scenario, assume that service provider 150 also provides Internet service to the customer. Habit identifier logic 420 may access Internet access history associated with user device 140, identify websites visited and time spent on particular websites, identify types of websites frequently visited (e.g., sports related websites, shopping websites, particular retailer websites, etc.), identify searches made and/or browsing history, etc. Habit identifier logic 420 may use this data to identify habits and current interests of a customer.

For example, habit identifier logic 420 may determine that the customer, while watching TV, entered a search query for a subwoofer in the browser of user device 140 and searched several stereo system websites for subwoofers. In this case, habit identifier logic 420 may determine that the customer is currently interesting in purchasing a subwoofer.

Keyword identifier logic 430, as described above, may identify keywords/terms associated with a program currently being viewed. For example, keyword identifier logic 430 may include speech recognition software that identifies words/terms frequently spoken in a particular TV program. As an example, assume that the user is watching a TV program about the Caribbean and the terms "Caribbean" and "cruise" are voiced a large number of times. In this case, keyword identifier logic 430 may identify Caribbean and cruise as key words. Keyword identifier logic 430 may also identify keywords/terms based on subtitles provided for a program currently being viewed, such as closed captioning subtitles, subtitles for foreign language programs, etc. Keyword identifier logic 430 may further identify keywords based on program guide information for a program currently being viewed, as well as for programs viewed in the past, such as programs viewed in the last 30 minutes, 60 minutes, 24 hours, etc.

CRM system 410, habit identifier logic 420 and keyword identifier logic 430 may input the obtained information to ad delivery engine 210 (block 510). Ad delivery engine 210 may use this information to identify ads that are likely to be relevant to the customer, as described in more detail below.

Ad delivery engine 210 may also obtain information regarding the customer from external entities (block 520). For example, third party data logic 440 may obtain data regarding the customer via marketing entities that gather data on viewers, such as demographic information including estimated income information, publications to which the customer subscribes, etc. Third party data logic 440 may also gather information regarding the customer from social websites (e.g., the customer's interests), professional network websites (e.g., the customer's profession), etc. Based on the demographic information, third party data logic 440 and/or ad delivery engine 210 may identify ads for products/services that the customer would likely be interested. As an example, based on demographic information, such as the customer's estimated salary information, number of members in the customer's household, age of household members, etc., third party data logic 440 and/or ad delivery engine 210 may determine that the customer would be more likely to be interested in automobile ads for four door, mid-level or luxury cars than ads for small, two door economy cars. Third party data logic 440 may forward this information to ad delivery engine 210 (block 520).

Ad delivery engine 210 may also receive user preference information via ad delivery user interface 240 (block 530). As described above, ad delivery user interface 240 may include a GUI that allows a user to define criteria with respect to advertisements. For example, a user may define types or categories of ads that he/she does not want to view, such as ads associated with alcohol related products, ads associated with sexual content, ads for certain types of food (e.g., sugary snacks), ads for certain types of toys, ads with violent themes, etc. The user may also define ads/types of ads that he/she wishes to view (e.g., ads for new consumer electronics, ads for home remodeling products, ads for automobiles, etc.). As described above, in some implementations, ad delivery user interface 240 may allow the user to enter subjective criteria associated with delivering ads, such as request that service provider 150 provide only ads that are deemed appropriate for the entire family, including young children, provide ads that do not promote unhealthy foods, provide ads that are humorous, etc. Ad delivery user interface 240 may forward the user-defined criteria to ad delivery engine 210.

Ad delivery engine 210 may use the received information to identify ads or types of ads that are likely to be relevant or of interest to the customer (block 540). For example, based on all the received information, ad delivery engine 210 may determine that the customer is likely to be in a demographic in which he/she may want to purchase a luxury car, but does not want to view beer-related commercials. In this case, ad delivery engine 210 may signal an ad inserter (not shown) that is part of the head end system used by service provider 150 to replace ads for beer in a television programming data stream provided to the customer with ads for luxury cars. In other implementations, service provider 150 may blank out certain ads (e.g., beer-related ads) and not provide any replacement ads. That is, service provider 150 may provide a black screen or a screen with other information (e.g., weather, time, a message that programming will continue shortly).

In this case, assume that ad delivery engine 210 identifies ads during each ad slot that are appropriate or tailored to the customer at communication device 110. Service provider 150 may then insert the identified ads/types of ads in the television programming stream based on the information received from ad delivery engine 210 and provide the ads to the customer (block 550). In this manner, service provider 150 may deliver ads that are more likely to be relevant to the particular customer than ads provided by the broadcast networks to all customers.

In some implementations, ad delivery user interface 240 may allow the user to input preference information regarding the number of ad overlays that will be served to the customer. For example, an ad overlay may include an ad placed in the lower portion of a displayed media stream, on a side portion of the displayed media stream or somewhere else that does not interfere or obstruct the customer's viewing of the program being provided to the customer. In this case, ad delivery user interface 240 may allow the user to input information identifying the maximum number of ad overlays that the customer would like to view in a predetermined period of time (e.g., 30 minutes). Ad delivery engine 210 may receive this information from ad delivery user interface 240 and provide no more ad overlays than the customer would like to view in the predetermined period of time.

As described above, ad delivery engine 210 may deliver ads from various companies to particular customers. In some implementations, service provider 150 may track the effectiveness of ads or ad campaigns undertaken by companies, as described in detail below.

Figure 6:
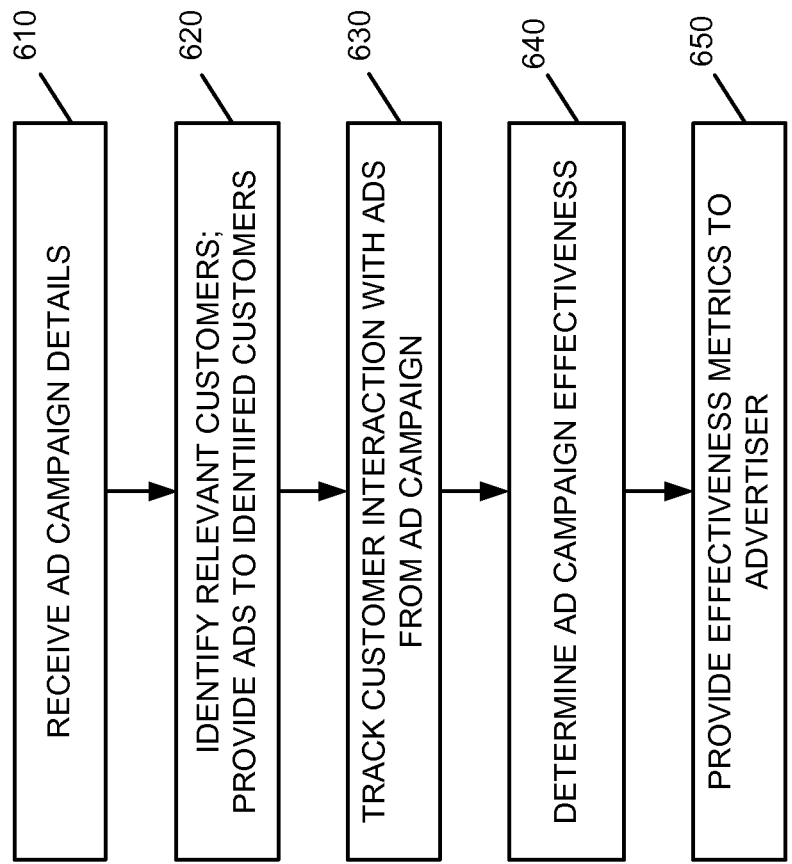
FIG. 6 is a flow diagram illustrating exemplary processing associated with tracking advertisements.

FIG. 6 illustrates exemplary processing associated with tracking advertisements that may be part of a company's ad campaign. For example, assume that a particular restaurant has undertaken an ad campaign to reach potential customers via television programming. In conventional situations, ads are generally controlled by the networks. In this implementation, service provider 150 may provide slots to particular companies (e.g., electronics manufactures, restaurants, etc.) for inserting ads that are destined to particular viewers for whom the ads are more likely to be relevant, as compared to providing the ads to all viewers. Processing may begin with service provider 150 receiving details regarding the ad campaign (block 610). For example, assume that a restaurant would like to target customers between the ages of 25-40 having a family income greater than $50,000/year and who eat out more than once per week.

Ad delivery engine 210 may identify customers in this demographic range based on information provided by CRM system 410 and/or third party data logic 440 (block 620). Ad delivery engine 210 may then provide ad slots to the restaurant in media streams transmitted to the identified customers (block 620). For example, service provider 150 may provide the ad during television programs that the identified customers are currently watching. In some instances, service provider 150 may take into account the time of day when to provide the ad. For example, service provider 150 may insert the restaurant ad into the television programming stream at 4:00 PM (e.g., shortly before dinner time for most viewers).

Ad delivery engine 210 may track the customers' interaction with the ads (block 630). For example, if the ad is an interactive ad that allows the user to download a coupon or scan a QR code associated with a promotion, ad delivery engine 210 may determine how many of the customers receiving the ad interacted with the ad (e.g., downloaded a coupon, printed out a coupon, scanned the QR code, etc.). Ad delivery engine 210 may then calculate an effectiveness measure associated with the ad campaign (block 640). For example, ad delivery engine 210 may calculate a return on investment metric based on the number of views, total amount of time the ad was viewed, number of downloads or coupons, number of scanned QR codes, etc., and the cost of each ad. Ad delivery engine 210 may then provide the effectiveness metric to the advertiser (block 650). In this manner, ad delivery engine 210 may provide real world statistics/data regarding the effectiveness of an ad or ad campaign. This effectiveness measure may also allow the user to modify the ad campaign before spending too much money on less successful ads.

In some implementations, ad delivery engine 210 may allow the user to configure a network printer coupled to communication device 110 to download and print out coupons associated with provided advertisements. For example, ad delivery user interface 240 may include an option that allows the user to link communication device 110 to a printer and select a widget or control button on control device 130 to print out coupons of interest. Ad delivery engine 210 may also allow the user to save advertisements of interest to a folder on a computer device, such as user device 140, or in memory of communication device 110. The customer may then play the saved advertisements at a later time.

Figure 7:
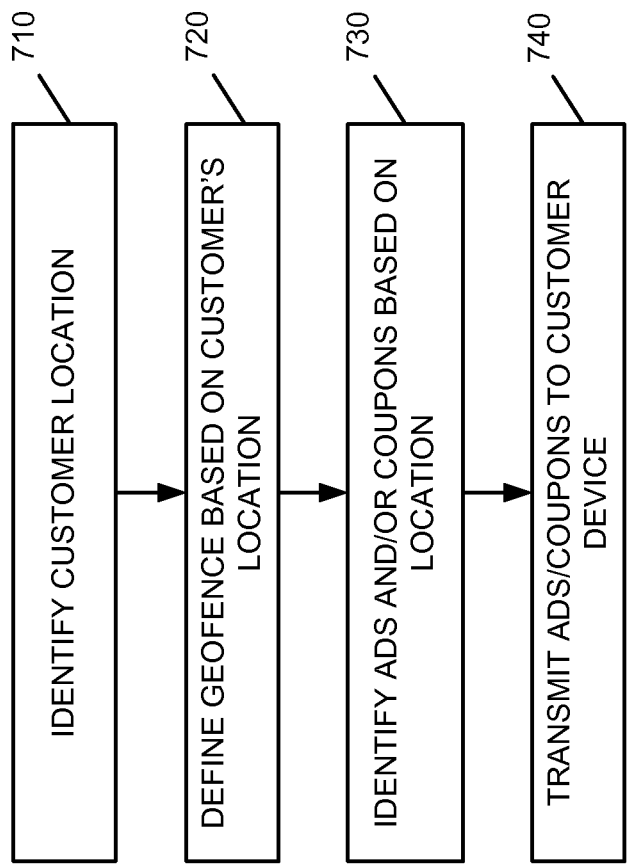
FIG. 7 is a flow diagram illustrating exemplary processing associated with providing advertisements based on location.

In some implementations, ad delivery engine 210 may deliver ads based on a customer's location. FIG. 7 illustrates exemplary processing associated with providing location-based advertising. In this example, assume that user device 140 is a mobile device, such as a smart phone, that includes an application provided by service provider 150 that allows user device 140 to receive ads, such as text based ads or multimedia based ads. Processing may begin with ad delivery engine 210 identifying the customer's location (block 710). For example, the application on user device 140 may transmit its location (e.g., global positioning system (GPS) coordinates) to service provider 150. Ad delivery engine 210 may then identify the customer's location based on the location of user device 140.

Ad delivery engine 210 may then generate a virtual "geofence" based on the customer's location (block 720). The virtual geofence may include a region within a certain radius (e.g., one mile, five miles, ten miles, etc.) of the customer's current location.

Ad delivery engine 210 may then identify ads that may be relevant to the customer's location (block 730). For example, assume that the goefence is set to a radius of ten miles from the customer's location and that a shoe retailer in a mall is located within the geofence. Further assume that the shoe retailer in the mall has contracted with service provider 150 to provide ads to customers. In this case, ad delivery engine 210 may transmit the appropriate ad to user device 140 (block 740). In some instances, ad delivery engine 210 may transmit a coupon, promotions code, QR code, etc., that allows the customer to obtain information regarding the retailer (e.g., current sales) and/or a discount at the retailer. In each case, ad delivery engine 150 may interact with an application provided on user device 140 to provide ads that are likely to be relevant to the customer.

In some implementations, ad delivery engine 210 may also determine whether the ads are likely to be relevant to the customers within the geofence before transmitting the ads to those potential customers. For example, assume that the customer associated with user device 140 has recently performed an Internet search query for women's shoes. In this case, ad delivery engine 210 may determine that the customer associated with user device 140 is likely to be interested in the ad from the shoe retailer and ad delivery engine 210 may transmit the ad to the customer associated with user device 140. As another example, if the customer associated with user device 140 is a 60 year old man, ad delivery engine 210 may determine that an ad from a women's shoe retailer would not likely be relevant to that customer and ad delivery engine 210 may not transmit such an ad to that user device 140. Ad delivery engine 210, however, may transmit an ad for running shoes associated with a sporting goods store in the mall to the 60 year old man.

In some instances, ad delivery engine 210 may charge a retailer based on reaching the advertiser's targeted demographic. Continuing with the example above, ad delivery engine 210 may charge a women's shoe retailer more for an ad delivered to a woman who recently performed an Internet search for women's shoes than an ad delivered to the 60 year old man who has not performed such a search.

In some implementations, ad delivery engine 210 may interface with a radio station to deliver ads. For example, when the customer associated with user device 140 is going shopping, the customer may tune to a designated ad-based station to receive audio-based advertisements.

Figure 8:
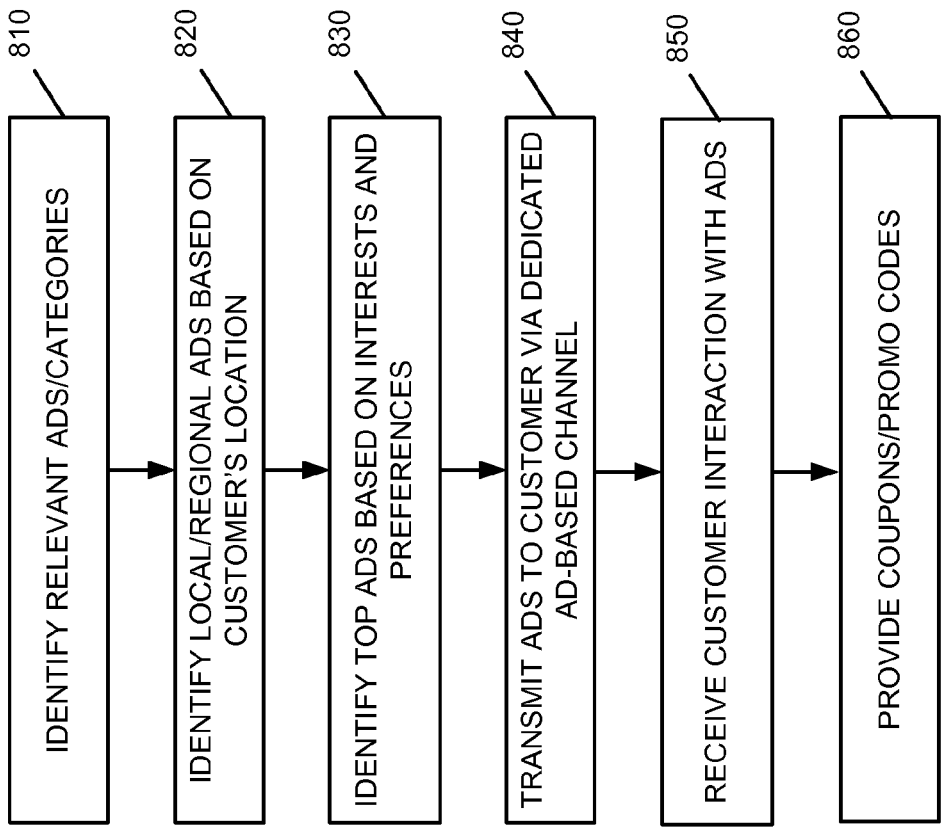
FIG. 8 is a flow diagram illustrating exemplary processing associated with providing an advertising channel.

As described above, service provider 150 may use ad delivery engine 210 to identify and/or provide ads that are more likely to be relevant to customers than ads provided to all customers. In some implementations, service provider 150 may provide a dedicated channel that provides ads to customers. FIG. 8 illustrates exemplary processing associated with providing an advertising channel to customers. Processing may begin with ad delivery engine 210 identifying ads or ad categories that are likely to be of interest to a customer (block 810). For example, assume that ad delivery engine determines that the customer associated with communication device 110 in FIG. 1 may be interested in consumer electronics, luxury cars and sports/running equipment, based on information received via CRM system 410, habit identifier logic 420, keyword identifier logic 430, third party data logic 440 and ad delivery user interface 240.

Ad delivery engine 210 may also identify location and regional ads based on the location of the customer (e.g., the location of the customer's home) (block 820). For example, ad delivery engine 210 may identify retailers located within a predetermined distance (e.g., 20 miles, 30 miles, etc.) of the customer's home.

Ad delivery engine 210 may then identify retailers with whom service provider 150 has contracted to provide ads to customers. Ad delivery engine 210 may then identify ads from the retailers with whom service provider 150 has contracted based on the customer's interests and preference information (block 830). For example, ad delivery engine 210 may identify the top 50 ads that are most likely to be relevant to the customer, based on the information gathered from the customer and about the customer, such as the customer's viewing habits, profile, etc.

Ad delivery engine 210 may then transmit the identified ads to the customer via the dedicated ad-based channel (block 840). For example, assume that service provider 150 provides television programming to the customer via network 160. In this case, service provider 150 may provide a particular channel (e.g., channel 100) as the ad-based channel. In this case, the ad channel may act as personal shopping channel associated with the customer's particular interests. For example, ads may run consecutively on a loop. In some instances, the ad channel may allow the user to view a guide of all the available ads and select one of the ads for viewing in an on-demand mode.

In some implementations, some of the ads provided on the ad channel may be interactive ads. For example, some of the ads may include widgets or interactive boxes that a user may select via control device 130. Assume that the customer interacts with one of the widgets that allow the user to press an input button on control device 130 to receive additional information, coupons and/or promotional codes associated with the ad (block 850). In this case, ad delivery engine 210 may deliver the coupon or promotional code that can be used to obtain a discount (block 860).

Ad delivery engine 210 may continuously update the most likely relevant ads on the ad channel to enhance the customer's experience. In addition, in some implementations, ad delivery engine 210 may track the effectiveness of the ads on the ad channel in a similar manner as that described above with respect to FIG. 6. In still further implementations, ad delivery engine 210 may include ads on the ad channel that other customers found to be useful. For example, some ads may include interactive widgets that allow customers to rate the ads. In this case, ads that are rated very highly or as containing useful information may be included on other customers' ad channel. In this manner, the ad channel is more likely to contain ads that the customer would like to view.

Implementations described herein allow a service provider to provide advertisements that are likely to be relevant to a customer and to provide an enhanced customer experience with respect to receiving ads. In addition, the service provider may continuously update information regarding the customer to further tailor the user's ad experience based on the customer's current habits, profile and/or preferences. In addition, implementations described herein allow a service provider to collect data regarding the effectiveness of ads or ad campaigns and provide the effectiveness information to advertisers. This may allow advertisers to further tailor the ads/ad campaigns to particular customers.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, some of the implementations described above refer to a television service provider provided television programming to customers. In other implementations, a service provider may provide any type of information to customers or viewers, such as video pod casts, streaming media presentations, etc. In each case, the service provider may identify ads that are likely to be relevant to the particular customer or viewer and provide the identified ads to the customer/viewer.

Further, implementations described above refer to ad delivery engine 210 receiving inputs from CRM system 410, habit identifier logic 420, keyword identifier logic 430, third party data logic 440 and ad delivery user interface 240. In other implementations, ad delivery engine 210 may receive inputs from additional sources that have information that can be used to generate information regarding the customer. In addition, ad delivery engine 210 may weight some of the received information more heavily than other information.

For example, ad delivery engine 210 may weight preference information received from ad delivery user interface 240 more heavily when attempting to identify relevant ads than ads received from third party data logic 440, since information from ad delivery user interface 240 represents explicit information regarding ads or types of ads that the customer would like to receive and/or would not like to receive. In such instances, explicit preference information from the customer is weighted more heavily than implicit information gained from analyzing the customer's actions.

Further, ad delivery engine 210 may weight information regarding some of the customer's habits differently than others. For example, a customer's recent Internet search queries may be weighted more heavily with respect to identifying relevant ads than a customer's habits with respect to Internet browsing. As an example, habit identifier logic 420 and/or ad delivery engine 210 may weight a search query from the customer for the term "subwoofer," followed by the customer searching several stereo retailer websites, very highly with respect to attempting to identify relevant ads. As a result, ad delivery engine 210 may insert an ad for a stereo retailer into the customer's television programming very soon after the customer's Internet search query. In some instances, service provider 150 may charge the stereo retailer more than its normal fee for providing the ad to a customer who recently performed such a search query (e.g., the search query for "subwoofer").

Still further, implementations described above refer to a customer setting his/her preference information via ad delivery user interface 240 and ad delivery engine 210 identifying ads based on the customer provided information. In some implementations, different members of a customer's family may provide different preference information. For example, a parent in the customer's household may provide preference information to allow a child to view commercials appropriate for children. In this case, when the child is watching TV, the child or parent may enter a code associated with the child such that ad delivery engine 210 provides only ads appropriate for children. At a later time, the parent may enter a code indicating that he/she is viewing and ad delivery engine 210 may provide ads based on the parent's preferences. In this manner, ad delivery engine 210 may deliver different ads or types of ads to a viewing device within a customer's household based on who is viewing.

In addition, while series of acts have been described with respect to FIGS. 5-8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving first information identifying profile information associated with a customer, habit information associated with the customer's television viewing habits, and Internet usage information associated with the customer, wherein the Internet usage information identifies websites accessed by the customer and an amount of time spent on at least some of the websites;
    receiving preference information from the customer, the preference information identifying advertisements or types of advertisements that the customer at least one of would like to view or would not like to view;
    identifying advertisements based on the received first information and the received preference information;
    inserting, by a service provider, the identified advertisements in a television programming data stream;
    providing, by the service provider, the television programming data stream with the identified advertisements to the customer;
    receiving, via input from the customer, information identifying a maximum number of advertisement overlays to be provided in the television programming data stream over a predetermined period of time; and
    providing a first number of advertisement overlays in the television programming data stream, wherein the first number does not exceed the maximum number in the predetermined period of time.

2. The method of claim 1, further comprising:
    identifying the habit information based on the customer's actions with respect to advertising provided in the television programming data stream.

3. The method of claim 2, wherein the identifying the habit information comprises:
    identifying an advertisement or type of advertisement that the customer fast forwards through or does not view by changing to another channel.

4. The method of claim 1, further comprising:
    identifying the Internet usage information based on search queries made by the customer and the websites or types of websites accessed by the customer.

5. The method of claim 1, further comprising:
    identifying the profile information associated with the customer based on services subscribed to by the customer, products purchased by the customer, pay per view programs viewed by the customer and demographic information associated with the customer.

6. The method of claim 1, further comprising:
    providing a user interface to the customer, wherein the user interface is configured to receive, from the customer, preference information identifying advertisements or types of advertisements that the customer would like to view.

7. The method of claim 6, wherein the user interface is further configured to receive, from the customer, preference information identifying advertisements or types of advertisements that the customer would not like to view.

8. The method of claim 1, further comprising:
    identifying a location of a mobile device associated with the customer, wherein the mobile device is a different device than a device used to receive the television programming data stream provided by the service provider; and
    providing advertisements to the mobile device based on the location and at least one of the profile information, the habit information or the Internet usage information.

9. The method of claim 1, further comprising:
    providing, to a plurality of customers, at least one advertisement that is part of an advertising campaign;
    receiving, from at least some of the plurality of customers, information associated with customer interaction or feedback associated with the at least one advertisement; and
    generating an effectiveness measure for the advertising campaign based on the customer interaction or feedback.

10. The method of claim 1, further comprising:
    obtaining information about the customer from at least one entity that does not provide television service, Internet service or telephone service to the customer, wherein the at least one entity is not the customer; and
    using the obtained information to generate the profile information.

11. The method of claim 1, further comprising:
    removing or blocking, from the television programming data stream, at least some advertisements based on the preference information.

12. The method of claim 11, further comprising:
    inserting, in the television programming data stream and in place of the removed or blocked advertisements, the identified advertisements.

13. The method of claim 1, further comprising:
    providing, by the service provider, an advertisement channel, wherein the advertisement channel is configured to provide advertisements to the customer based on the profile information, the habit information, the Internet usage information and the preference information.

14. A system, comprising:
    a service provider device configured to forward television programming to a customer device; and
    at least one logic device configured to:
        receive first information identifying profile information associated with a customer associated with the customer device, habit information associated with the customer's television viewing habits, and Internet usage information associated with the customer, wherein the Internet usage information identifies websites accessed by the customer and an amount of time spent on at least some of the websites,
        receive preference information from the customer, the preference information identifying advertisements or types of advertisements that the customer at least one of does not want to view or wants to view,
        identify advertisements based on the received first information and the received preference information, and
        insert the identified advertisements in a television programming data stream,
    wherein the service provider device is further configured to forward, to the customer, the identified advertisements in the television programming data stream,
    wherein the at least one logic device is further configured to:
        receive, via input from the customer, information identifying a maximum number of advertisement overlays to be provided in the television programming data stream over a predetermined period of time, and
    wherein the service provider device is further configured to:
        provide a first number of advertisement overlays in the television programming data stream, wherein the first number does not exceed the maximum number in the predetermined period of time.

15. The system of claim 14, wherein the at least one logic device is further configured to:
    identify the habit information based on the customer's actions with respect to advertising provided in the television programming data stream.

16. The system of claim 15, wherein the at least one logic device is further configured to:
    identify the Internet usage information based on search queries made by the customer and the websites or types of websites accessed by the customer.

17. The system of claim 14, wherein the service provider is further configured to provide a channel dedicated to ads, wherein the dedicated channel provides the identified ads.

18. A device, comprising:
    a communication interface configured to receive programming from a service provider; and
    logic configured to:
        identify habit information based on a customer's television viewing habits,
        identify words or terms spoken in a television program being viewed by the customer,
        provide a user interface configured to allow the customer to input preference information identifying advertisements or types of advertisements that the customer at least one of would like to view or would not like to view,
        receive, via the user interface, the preference information, and
        receive, via input from the customer, information identifying a maximum number of advertisement overlays to be provided in the programming from the service provider over a predetermined period of time,
    wherein the communication interface is further configured to:
        forward the habit information, the identified words or terms, the preference information and the information identifying the maximum number of advertisement overlays to the service provider, and
        receive advertisements, from the service provider, based on the habit information, the identified words or terms and the preference information, and
        receive a first number of advertisements overlays in the programming provided by the service provider, wherein the first number does not exceed the maximum number in the predetermined period of time.

19. The device of claim 18, wherein the device comprises a set top box or a television.

20. A method, comprising:
    identifying a location of a mobile device associated with a customer;
    identifying a region within a first distance of the location of the mobile device;
    identifying profile information associated with the customer based on the customer's television viewing habits;
    identifying Internet usage information associated with the customer, wherein the Internet usage information identifies websites accessed by the customer and an amount of time spent on at least some of the websites;
    receiving, via input from the customer, information identifying a maximum number of advertisement overlays to be provided in a television programming data stream over a predetermined period of time, and
    identifying advertisements to provide to the mobile device based on the identified location, the identified region, the profile information and the Internet usage information;
    transmitting the advertisements to the mobile device while the mobile device is located in the identified region; and
    providing a first number of the identified advertisements as advertisement overlays in the television programming data stream provided to the mobile device, wherein the first number does not exceed the maximum number in the predetermined period of time.

21. The method of claim 20, wherein the identifying profile information further comprises:
    identifying the profile information associated with the customer based on services subscribed to by the customer, products purchased by the customer, pay per view programs sent to the customer and demographic information associated with the customer.

22. The method of claim 20, further comprising:
    receiving preference information from the customer, the preference information identifying types of advertisements that the customer does not want to view; and
    removing or blocking, from a television programming data stream, at least some advertisements based on the preference information.

* * * * *